UNITED STATES PATENT OFFICE.

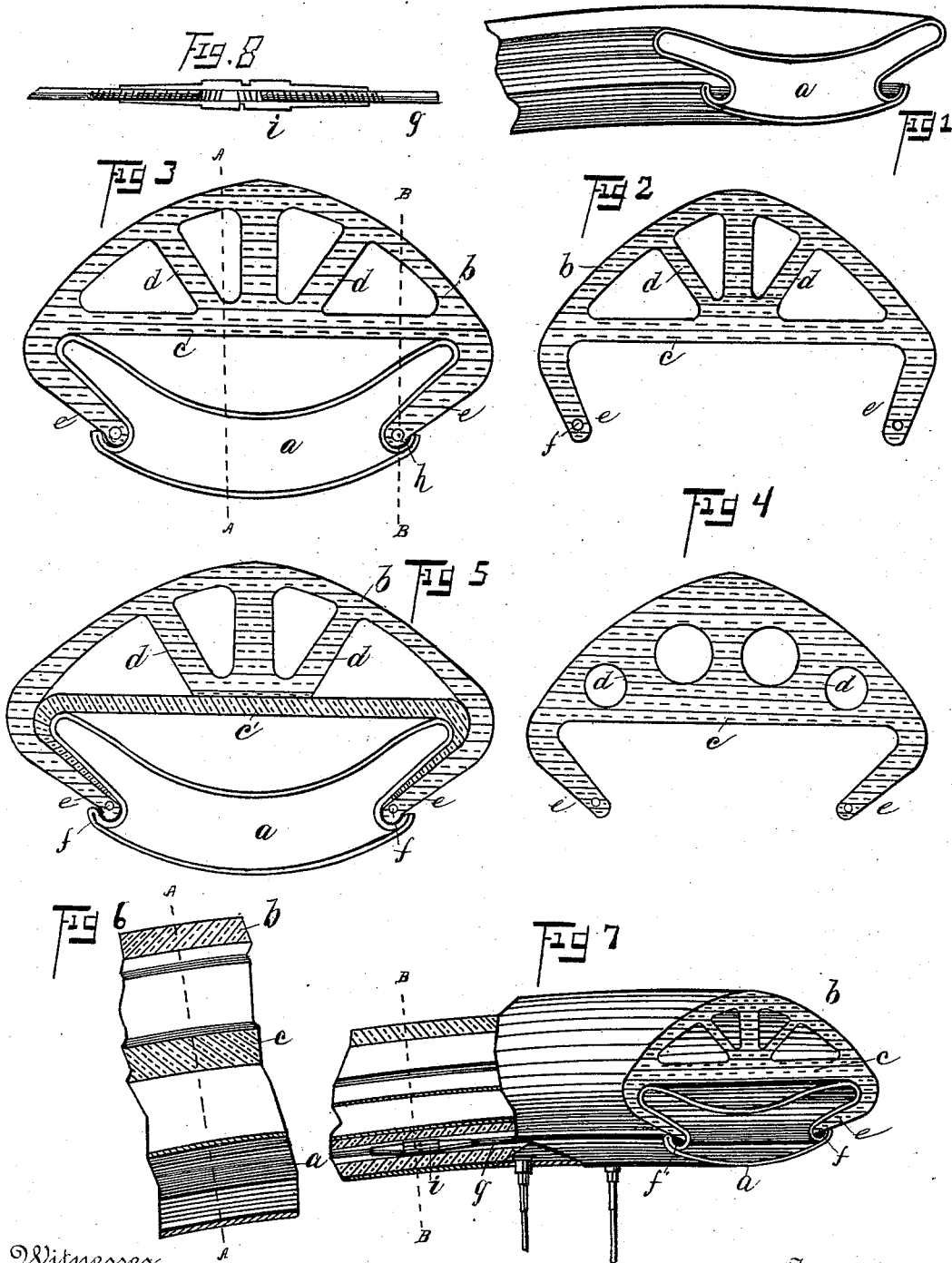

ROBERT M. KEATING, OF SPRINGFIELD, MASSACHUSETTS.

CUSHION-TIRE AND RIM THEREFOR.

SPECIFICATION forming part of Letters Patent No. 485,633, dated November 8, 1892.

Application filed August 24, 1891. Serial No. 403,575. (No model.)

*To all whom it may concern:*

Be it known that I, ROBERT M. KEATING, a citizen of the United States of America, residing at Springfield, in the county of Hampden and State of Massachusetts, have invented new and useful Improvements in Cushion-Tires and Rims or Fellies for the Same for Bicycles, Tricycles, &c., of which the following is a specification, reference being had to the accompanying drawings, and letters of reference marked thereon, in which drawings, like letters of reference indicating like parts—

Figure 1 is a perspective view of my improved rim or felly. Fig. 2 is a transverse sectional view of the cushion-tire adapted to be mounted upon said rim. Fig. 3 is a like view showing the tire mounted upon the rim. Fig. 4 is a like view illustrating a modification in the construction of the tire. Fig. 5 is a view illustrating another modification. Fig. 6 is a longitudinal sectional view taken on line $a\,a$. Fig. 7 is a perspective view of the complete device, and Fig. 8 is a side view of a coupling-link.

In detail, $a$ indicates the felly or rim, $b$ the outer portion of the tire, and $c$ the inner portion of the tire, which extends from side to side of the rim.

$d$ indicates stays or braces extending from the inner part $c$ to the outer part $b$.

$e$ indicates an overhanging portion of the tire, by means of which the same is secured to the rim.

$f$ indicates openings extending through said portion $e$; $g$, a rod extending through the same; $h$, recessed portion in the rim to receive the overhanging parts $e$, and $i$ a coupling-link.

The construction will be readily understood on reference to the drawings. The metallic felly or rim is formed up of sheet metal, the periphery being concaved and the inner circumference of the complete rim being shaped substantially as shown in the drawings, and the metal being preferably formed up at each side of the rim to provide an annular recess, the lips of which overhang.

The tire is formed of any of the usual elastic materials employed for such purposes, and is made of a less width than the width of the rim. When, therefore, it is placed in position, it is stretched across the rim, as shown in Figs. 3 and 5, thus drawing the central part $c$ taut, while the outer portion $b$ is not strained to the same extent. I prefer to employ radial braces or supports $d$, extending from the outer portion $b$ to the inner or base portion $c$, so that the elasticity of the inner portion $c$ may be utilized to its greatest extent. The base portion $c$ may be made integral with the remainder of the tire, as shown in Figs. 2, 3, and 4, or a separate piece may be employed for that purpose, as shown in Fig. 5. This construction enables me to replace the interior part $c$ if the same should become defective from any cause.

It will be seen that various methods of securing this tire to the rim may be employed. I prefer, however, to employ the method illustrated herein, which consists in forming the tire with depending side pieces $e$, which enter the annular side recesses $h$ in the rim, and a rod $g$ is passed through the openings $f$, formed in the depending parts $e$, and the ends united by a coupling-link $i$. I prefer, also, to employ a rod of sufficient size and to make the portion through which the rod passes of sufficient thickness so that the rod will cause the portion of material through which it passes to be bulged at the sides and entirely fill the annular side recesses, thus tending strongly to hold the depending parts $e$ tightly in position. If an independent part $c$ is employed, as shown in Fig. 5, then the ends are preferably made tapering and are clamped between the parts $e$ and the rim, thus binding the same in position. It will be seen that the form of the openings through the tire may be modified, if desired. For instance, the same may be constructed as illustrated in Fig. 4. I deem, however, the construction first described the better.

The rim may be formed up of one piece of sheet metal, as shown, or two pieces may be employed; and it will be seen that the peculiar construction illustrated forms a light, strong, and rigid rim, and the shape is such that the opposite or top and bottom sides of the respective parts are substantially parallel, or, in other words, it is double-walled throughout. It will be seen, also, that the formation of recesses in the side walls gives to the rim a certain degree of elasticity which would be absent were they omitted, and that an ordinary tire may be mounted in the outer annular peripheral recess in the common manner, and that the side bends will serve to cushion the whole device.

In the employment herein of the term "side walls" I wish it understood that I do not refer to that portion of the rim wherein the tire usually rests.

Having therefore described my invention, what I claim, and desire to secure by Letters Patent, is—

1. The combination of a rim having the periphery lowest in the center with an elastic tire formed with a part $c$ to extend across the rim-face and an outer raised portion $b$, substantially as shown.

2. The combination of a rim having its periphery lowest in the central portion with an elastic tire formed with a straight base portion, a raised outer portion, and with ribs extending from the one to the other, substantially as shown.

3. The combination of a rim lowest in the center of its periphery with an elastic tire having a straight base portion to rest on the raised side portions of the rim and formed with a raised outer portion and having depending parts $e$ and means to secure the parts $e$ to the rim, substantially as shown.

4. The combination of a rim having the side portion of its periphery raised above the intermediate portion with an elastic tire having a base portion of less width normally than the space between the sides of the rim and having a raised outer portion, and means to secure the rim and tire together, substantially as shown.

5. The combination of a tire formed with the intermediate portion of its periphery of less diameter than the sides, a strip of elastic material, as $c'$, stretched from side to side, and a raised tire mounted outside the latter, substantially as shown.

6. The combination of a tire formed with annular side recesses with an overhanging wall with a tire mounted on said rim and provided with side parts $e$, whose edges are adapted to enter said recesses, and rods arranged in said recesses and embedded in the parts $e$ therein, substantially as shown.

7. A hollow rim consisting of an outer tire-receiving part curved inwardly in cross-section, the side parts being bent downwardly, then backwardly substantially parallel with the upward curve, then carried downwardly again, and then formed in the central portion in a curve approximating the curve of the tire-receiving part, substantially as shown.

ROBERT M. KEATING.

Witnesses:
ALLEN WEBSTER,
WM. CONNOLLY.